United States Patent [19]  [11] 4,098,337
Argabright et al.  [45] Jul. 4, 1978

[54] METHOD OF IMPROVING INJECTIVITY PROFILES AND/OR VERTICAL CONFORMANCE IN HETEROGENEOUS FORMATIONS

[75] Inventors: Perry A. Argabright, Larkspur; John S. Rhudy; Brian L. Phillips, both of Littleton, all of Colo.

[73] Assignee: Marathon Oil Company, Findlay, Ohio

[21] Appl. No.: 812,212

[22] Filed: Jul. 1, 1977

[51] Int. Cl.$^2$ .................... E21B 33/138; E21B 43/22
[52] U.S. Cl. .................................. 166/270; 166/273; 166/294
[58] Field of Search ............... 166/270, 273, 274, 294, 166/295, 300

[56] References Cited
U.S. PATENT DOCUMENTS

| | | | |
|---|---|---|---|
| 3,396,790 | 8/1968 | Eaton | 166/270 |
| 3,603,397 | 9/1971 | Peray | 166/270 |
| 3,741,307 | 6/1973 | Sandiford | 166/273 |
| 3,749,172 | 7/1973 | Hessert et al. | 166/270 X |
| 3,762,476 | 10/1973 | Gall | 166/270 X |
| 3,841,405 | 10/1974 | Moote et al. | 166/295 X |
| 3,949,811 | 4/1976 | Threlkeld et al. | 166/270 X |
| 3,981,363 | 9/1976 | Gall | 166/270 |
| 4,009,755 | 3/1977 | Sandiford | 166/273 X |

*Primary Examiner*—Stephen J. Novosad
*Attorney, Agent, or Firm*—Joseph C. Herring; Jack L. Hummel

[57] ABSTRACT

Improved injectivity profiles and/or vertical conformance in flooding heterogeneous formations containing high permeability zones is obtained by injecting an aqueous polyacrylamide solution and an aqueous formaldehyde solution into the formation and allowing the polyacrylamide to react with the formaldehyde in the relatively high permeability zones to form a gel. Thereafter, improved sweep efficiency is realized in displacing hydrocarbon from the lesser permeability zones.

18 Claims, No Drawings

METHOD OF IMPROVING INJECTIVITY PROFILES AND/OR VERTICAL CONFORMANCE IN HETEROGENEOUS FORMATIONS

BACKGROUND OF THE INVENTION

1. Field of the Invention

This invention relates to displacing hydrocarbon from subterranean formations and more particularly to improving the injectivity profile and/or vertical conformance of the formation.

Description of the Prior Art

Heterogeneous hydrocarbon bearing subterranean formations, i.e., formations having relatively high permeability zones and relatively lesser permeability zones, are difficult to effeciently flood by secondary and/or tertiary recovery processes. The highly permeable zones tend to "thieve" the displacement and/or drive fluids of such processes. When all, or a substantial portion, of the displacement and/or drive fluids flow through the relatively high permeability zones and avoid the lesser permeability zones, fingering and premature breakthrough of the fluids occurs resulting in decreased sweep efficiency of the secondary or tertiary floods.

To increase the efficiency of formation flooding processes, it has been previously suggested to "bridge" the more permeable zones to cause plugging or partial plugging of the relatively high permeability zones. This forces subsequently injected displacement and/or drive fluids into the lesser permeability zones. Previously suggested plugging agents include cement, plastics, coal tar products and by-products, cotton seed hulls, various organic compounds, etc. Particularly attractive plugging agents include high molecular weight polymers, and crosslinked products thereof. U.S. Pat No. 3,973,629 to Knight, et al teaches radiation induced copolymerization of acrylamide and/or methacrylamide with acrylic acid, methacrylic acid and/or salts thereof to provide polymers which are particularly useful for this purpose. U.S. Pat. No. 3,926,258 to Hessert, et al teaches the use of polyacrylamide, polysaccharide and/or cellulosic polymers with multivalent metal ions, a complexing agent and a reducing agent for such purposes. Other U.S. patents teaching the use of polymers in subterranean strata include U.S. Pat. Nos. 3,334,689 to McLaughlin; U.S. Pat. No. 3,421,584 to Eilers et al and U.S. Pat. No. 3,502,149 to Pence, Jr.

SUMMARY OF THE INVENTION

Applicants have discovered that improved injectivity profiles and/or vertical conformance can be obtained by injecting into a heterogeneous formation an aqueous solution containing unhydrolyzed or partially hydrolyzed polyacrylamide and an aqueous formaldehyde solution. The polyacrylamide is permitted to react with the formaldehyde in situ in the relatively high permeabiltiy zones to form a hydroxymethylated polyacrylamide gel which reduces the permeability.

DESCRIPTION OF THE PREFERRED EMBODIMENTS

The invention is especially useful with secondary and tertiary recovery processes wherein a displacing fluid is used to displace hydrocarbon from a subterranean hydrocarbon bearing formation. The displacing fluid can be any fluid which effectively displaces crude oil from the formation, e.g., it can be an immiscible, miscible or miscible-like displacing fluid. In addition, the displacing fluid may be followed by an aqueous mobility buffer fluid comprising a mobility reducing agent and/or additionally followed by a drive fluid. Examples of immiscible displacing fluids include aqueous waterfloods which may contain a mobility reducing agent in at least a portion of the waterflood to impart mobility control to the flooding process. Examples of miscible and miscible-like displacing fluids include emulsions, oil or water-external micellar dispersions, oil-miscible fluids, soluble oils, etc. These fluids are preferably followed by an aqueous solution comprising a mobility reducing agent, and by a drive fluid. Examples of useful displacing fluids include those defined in U.S. Pat. Nos. 3,254,714 and 3,275,075 to Gogarty, et al; U.S. Pat. No. 3,497,006 to Jones, et al; U.S. Pat. No. 3,506,070 to Jones; U.S. Pat. Nos. 3,330,344, 3,330,348 and 3,330,611 to Reisberg; U.S. Pat. No. 3,537,520 to Holm, etc.

Polyacrylamides useful with the present invention include partially hydrolyzed and unhydrolyzed polyacrylamides and copolymers, terpolymers, etc., containing an acrylamide group within the polymer. Preferably, the polyacrylamides have molecular weights in the range of 100,000 to about 100,000,000 or more, preferably about 1,000,000 to about 75,000,000 and more preferably about 2,500,000 to about 50,000,000. Examples of useful polyacrylamides include polymers sold under the tradenames "Pusher" by Dow Chemical Company, Midland, Michigan, U.S.A.; "Uni-Perm" and "Hi-Vis" by Betz Laboratories, Inc., Trevose, Pa., U.S.A.; and "Calgon 454" by Calgon Corporation, Pittsburgh, Pa., U.S.A. The preferred concentration of polyacrylamide in the aqueous solution is dependent upon formation characteristics and the degree of plugging or partial plugging desired. For most purposes, the aqueous polymer solution should contain about 50 to about 10,000, preferably about 100 to about 5,000 and more preferably about 200 to about 2,500 ppm (parts per million) by weight of polyacrylamide.

Formaldehyde used with the invention can be in the form of an aqueous solution (i.e., formalin) or an aqueous solution of trioxane or paraformaldehyde which yield formaldehyde upon heating.

The water used in preparation of the aqueous polyacrylamide and/or formaldehyde solutions is preferably fresh water, but may be slightly saline or brackish water, e.g., it can contain up to 10,000 ppm or more of TDS (total dissolved solids).

In general, a slight stoichiometric excess of formaldehyde will be preferred in forming the hydroxymethylated polyacrylamide gel, although this is not critical to the invention. Formaldehyde will preferably be present and available for reaction in situ with the polyacrylamide in amounts of about 0.01 to about 10.0, preferably about 0.1 to about 5.0 and more preferably from about 0.5 to about 2.0 moles of formaldehyde for each mole of amide groups within the polyacrylamide. Any excess formaldehyde may act in situ as an oxygen scavenger, bactericide, sacrificial agent, etc.

Hydroxymethylation of the polyacrylamide will occur most readily under alkaline conditions and is preferably conducted at a pH within the range of about 7.5 to about 11.0, preferably about 8.0 to about 10.5 and more preferably about 10.0 to about 10.5. The reaction is preferably conducted at a temperature in the range of about 0° to about 300° C, preferably about 20° to about 200° C and more preferably from about 30° to about 90° C.

Due to the dependence of rate of gel formation upon solution pH and temperature conditions, these reaction variables can be effectively used in designing the reaction system to retard gel formation until the aqueous polyacrylamide has been displaced into the desired relatively high permeability zone of the formation. For example, in some cases it may be desirable to lower the pH of the aqueous polyacrylamide solution to about 2.0 to about 7.5, preferably about 3.0 to about 7.0 and more preferably about 4.0 to about 6.5, prior to contacting the polyacrylamide with formaldehyde. The aqueous polyacrylamide solution may then be injected into the formation and displaced to the treatment zone whereat alkaline conditions in the formation will elevate the solution pH to a preferred reaction range. In other cases, such as in a relatively deep formation, it may be desirable to incorporate the formaldehyde into the aqueous polyacrylamide solution at the surface and reply upon elevated formation temperatures to accelerate hydroxymethylation. In still other cases, it may be desirable to retard gel formation by injecting the aqueous polyacrylamide solution and the aqueous formaldehyde solutions as separate solutions and perhaps as sequentially alternating slugs. The foregoing examples of reaction control are merely illustrative. There are an infinite number of modifications and combinations of these control factors that can be utilized in designing an optimum treatment mechanism to meet specific formation conditions.

The preferred volume amount of the aqueous polyacrylamide solution injected into the hydrocarbon bearing formation is dependent upon formation characteristics and the degree of plugging or partial plugging desired. Formation pore volumes (based upon the effective pore volume to be treated in the formation) of about 0.1 to about 70%, more preferably about 1 to about 50% and most preferably about 5 to about 25% are generally sufficient to improve the injectivity profile or vertical conformance of most formations. The aqueous polyacrylamide solution can be injected as one slug or as multiple slugs; however, the total volume injected will generally not be greater than the foregoing pore volumes. Within the above framework, where the injectivity profile of a well is to be improved, volume amounts of about 1 to about 500, preferably about 5 to about 250 and more preferably about 25 to about 200 gallons per vertical foot of formation to be treated are useful. If it is desired to restore some of the formation permeability, aqueous solutions of polymer degrading materials such as hydrazine, sodium hypochlorite and like chemicals may be injected into the treated formation. In addition, packers, chokes in injection strings, etc., can be used to inject the aqueous polyacrylamide and/or formaldehyde solution(s) into a particular strata. Under specific formation conditions, it may also be desirable to incorporate other synthetic and/or naturally occurring polymers into the aqueous polyacrylamide solution to enhance the plugging efficiency of the hydroxymethylated polyacrylamide gel.

EXAMPLES

The following illustrative examples teach specific embodiments of the inventive concepts. Unless otherwise specified, all percentages are based on weight.

EXAMPLE I

An aqueous polyacrylamide solution suitable for use in the partial plugging of a subterranean formation is prepared by adding 0.38 grams of $Na_3PO_4 \cdot 12H_2O$ to 100 grams of 1% by weight unhydrolyzed polyacrylamide in distilled water. The mixture is stirred to dissolve the salt. To this aqueous polyacrylamide solution is added 0.45 grams of paraformaldehyde (resulting in HCHO to $—CONH_2$ molar ratio of 1.1) and the mixture is stirred for two hours at about 45° to about 50° C. Dilution of the reaction product to 1000 ppm with water containing 400 ppm NaCl and 55 ppm $CaCl_2$ yields a hydroxymethylated polyacrylamide solution having the following properties as compared to a similarly diluted solution of the unreacted polyacrylamide:

Table I

| Polyacrylamide | Brookfield Viscosity (cp) | Screen Factor |
|---|---|---|
| Unreacted | 3.4 | 19 |
| Hydroxymethylated | 5.8 | 29 |

Screen factor is determined by the method taught in SPE Paper 2867, entitled "Factors Influencing Mobility Control by Polymer Solution", Jennings, et al., copyright 1970. The hydroxymethylated polyacrylamide has a significantly higher screen factor and Brookfield viscosity than the unreacted polyacrylamide.

EXAMPLE II

An aqueous unhydrolyzed polyacrylamide solution is prepared according to the procedure of Example I and the pH of the solution is adjusted to about 5.5. A slight stoichiometric excess of formaldehyde is then incorporated into the solution. A heterogeneous hydrocarbon bearing subterranean formation is treated by injecting 0.5 PV (pore volumes) of the aqueous solution into the formation and displacing it into the more permeable zones of the formation with a connate water drive. Alkaline conditions in the formation result in a sufficient rise in solution pH to permit the formaldehyde and the unhydrolyzed polyacrylamide to react in the more permeable zones of the formation to form a hydroxymethylated polyacrylamide gel. A subsequently injected connate water flood results in increased residual oil recovery as compared with that obtained in a similar formation treated with 0.5 PV of an aqueous unhydrolyzed polyacrylamide solution followed by a connate water flood.

EXAMPLE III

An aqueous solution containing a partially hydrolyzed, high molecular weight polyacrylamide is treated similarly to the polyacrylamide of Example I. A hydroxymethylated polyacrylamide gel is obtained which tends to plug the more permeable zones in a reservoir rock sample.

The invention as described herein is capable of a variety of modifications and variations which will be apparent to a person skilled in the art and which are included in the spirit of the claims appended hereto.

What is claimed is:

1. A process for improving the injectivity profile and/or vertical conformance of a hydrocarbon bearing subterranean formation having relatively high permeability zones and relatively lower permeability zones, the process comprising injecting an aqueous polyacrylamide solution into the formation, injecting an aqueous formaldehyde solution into the formation, displacing the aqueous solutions into the relatively high permeability zones, and allowing the polyacrylamide and the formaldehyde to react in the relatively high permeability zones to form a gel which reduces the permeability of the relatively high permeability zones to obtain the improved injectivity profile and/or vertical conformance.

2. The process of claim 1 wherein the formaldehyde is incorporated into the aqueous polyacrylamide solution.

3. The process of claim 1 wherein the aqueous solutions of polyacrylamide and formaldehyde are separately injected into the formation.

4. The process of claim 3 wherein the aqueous solutions of polyacrylamide and formaldehyde are injected into the formation in alternating sequential slugs.

5. The process of claim 1 which further comprises reducing the pH of the aqueous polyacrylamide solution to about 3 to about 7 prior to injecting the aqueous polyacrylamide solution into the formation to retard the formation of the gel.

6. The process of claim 1 wherein the polyacrylamide is unhydrolyzed or partially hydrolyzed polyacrylamide.

7. The process of claim 1 wherein the polyacrylamide has a molecular weight in the range of about one hundred thousand to about one hundred million.

8. The process of claim 1 wherein the aqueous polyacrylamide solution comprises about 100 to about 2,000 ppm by weight of polyacrylamide.

9. The process of claim 2 wherein the aqueous polyacrylamide solution comprises about 0.1 to about 5.0 moles of formaldehyde per mole of amide groups within the polyacrylamide.

10. A process for recovering hydrocarbon from a hydrocarbon bearing subterranean formation having at least one injection means in fluid communication with at least one production means and further having relatively high permeability zones and relatively lower permeability zones, comprising injecting an aqueous solution of unhydrolyzed or partially hydrolyzed polyacrylamide into the formation, injecting an aqueous solution of formaldehyde into the formation, displacing the aqueous solutions into the relatively high permeability zones, allowing the polyacrylamide and formaldehyde to react in the relatively high permeability zones to form a gel which reduces the permeability of the high permeability zones, and then injecting a displacing fluid into the formation to displace hydrocarbon toward the production means to recover hydrocarbon therethrough.

11. The process of claim 10 wherein the formaldehyde is incorporated into the aqueous polyacrylamide solution.

12. The process of claim 10 wherein the aqueous solutions of polyacrylamide and formaldehyde are separately injected into the formation.

13. The process of claim 12 wherein the aqueous solutions of polyacrylamide and formaldehyde are injected into the formation in alternating sequential slugs.

14. The process of claim 10 which further comprises reducing the pH of the aqueous polyacrylamide solution to about 3 to about 7 prior to injecting the aqueous solution of polyacrylamide into the formation to retard the formation of the gel.

15. The process of claim 10 wherein the polyacrylamide has a molecular weight in the range of about one million to about seventy five million.

16. The process of claim 10 wherein the aqueous polyacrylamide solution comprises about 100 to about 2,000 ppm by weight of polyacrylamide.

17. The process of claim 10 wherein the aqueous polyacrylamide solution comprises about 0.1 to about 5.0 moles of formaldehyde per mole of amide groups within the polyacrylamide.

18. A process for improving the injectivity profile and/or vertical conformance of a heterogeneous subterranean formation having at least one injection means in fluid communication with at least one production means and having at least one relatively high permeability zone, the method comprising injecting an aqueous solution of unhydrolyzed or partially hydrolyzed polyacrylamide into the formation through the injection means, injecting an aqueous solution of formaldehyde into the formation through the injection means, displacing the aqueous solutions into the at least one relatively high permeability zone in the formation and allowing the polyacrylamide and the formaldehyde to react in the relatively high permeability zone to form a gel which reduces the permeability of the high permeability zone to obtain the improved injectivity profile and/or vertical conformance.

* * * * *

UNITED STATES PATENT OFFICE
CERTIFICATE OF CORRECTION

Patent No. 4,098,337                Dated July 4, 1978

Inventor(s) Perry A. Argabright et al.

It is certified that error appears in the above-identified patent and that said Letters Patent are hereby corrected as shown below:

Column 3, line 19, "reply" should read --- rely ---.

Column 4, line 21, "entilted" should read --- entitled ---.

Signed and Sealed this

Thirteenth Day of February 1979

[SEAL]

Attest:

RUTH C. MASON
*Attesting Officer*

DONALD W. BANNER
*Commissioner of Patents and Trademarks*